United States Patent [19]

Himes et al.

[11] 4,135,894

[45] Jan. 23, 1979

[54] AIR FILTRATION APPARATUS AND METHOD OF OPERATION THEREOF

[75] Inventors: Richard C. Himes; Bruce G. Craig, both of Littleton, Ohio

[73] Assignee: Andersen 2000, Inc., College Park, Ga.

[21] Appl. No.: 739,944

[22] Filed: Nov. 8, 1976

Related U.S. Application Data

[63] Continuation of Ser. No. 590,299, Jun. 25, 1975, abandoned.

[51] Int. Cl.² ............................................. B01D 47/00
[52] U.S. Cl. ........................................... 55/91; 55/232; 55/234; 55/243; 261/90; 261/92
[58] Field of Search ................... 55/90, 91, 92, 96, 97, 55/223, 233, 234, 240, 242, 243, 257 R, 259, 290, 295; 261/90, 92

[56] References Cited

U.S. PATENT DOCUMENTS

| 804,677 | 11/1905 | Sahlin | 261/92 |
|---|---|---|---|
| 1,272,489 | 7/1918 | Marascio | 261/92 |
| 1,273,791 | 7/1918 | Knowles | 55/233 |
| 1,690,635 | 11/1928 | Hubmann | 261/92 |
| 1,747,694 | 2/1930 | Birkholz | 261/92 |
| 2,163,452 | 6/1939 | Schmieg | 261/92 |
| 2,994,406 | 8/1961 | Hemeon | 55/242 |
| 3,250,059 | 5/1966 | Vosseller | 261/92 |
| 3,370,401 | 2/1968 | Lucas et al. | 55/90 |
| 3,395,901 | 8/1968 | Moser | 55/233 |
| 3,479,801 | 11/1969 | Yamasaki | 261/92 |
| 3,487,620 | 1/1970 | Klein et al. | 55/233 |
| 3,563,474 | 2/1971 | Robinson | 55/242 |
| 3,640,515 | 2/1972 | Stiles | 55/234 |
| 3,705,479 | 12/1972 | McPherson | 55/234 |
| 3,853,506 | 12/1974 | Pircon | 55/240 |
| 3,873,281 | 3/1975 | Himes et al. | 55/96 |

Primary Examiner—Bernard Nozick
Assistant Examiner—David L. Lacey
Attorney, Agent, or Firm—B. J. Powell

[57] ABSTRACT

Apparatus is described for the continuous removal of particulate matter from a gas stream using a filter medium. In the improved apparatus of this invention particulate laden air passes through a filter medium depositing the particulate on the solid members of the medium. Wash liquid is used to flush the particulate matter off of and/or through the filter for collection. The improved apparatus comprises a cleanable filter medium carried on a previous support, liquid supply means for providing wash liquid to clean the filter medium, motive means to cause relative motion between the support (and filter medium carried thereon) and the liquid supply means such that the wash liquid can impinge on a given portion of the filter medium from different directions over a period of time, and means for collecting and removing medium. Essentially all the particle laden water which is entrained in the gas stream is separated by use of mist eliminators or similar devices. The invention herein also includes a process for continuous gas filtration utilizing the described apparatus, wherein there is accomplished continuous in situ cleaning of the deposited particulate matter from the filter medium. The process is of especially utility for filtration of those gas systems wherein the velocity of the gas stream at the filter medium face is 300 to 4000 ft/min and the pressure drop across the filter medium is 7 to 60 inches of water.

10 Claims, 5 Drawing Figures

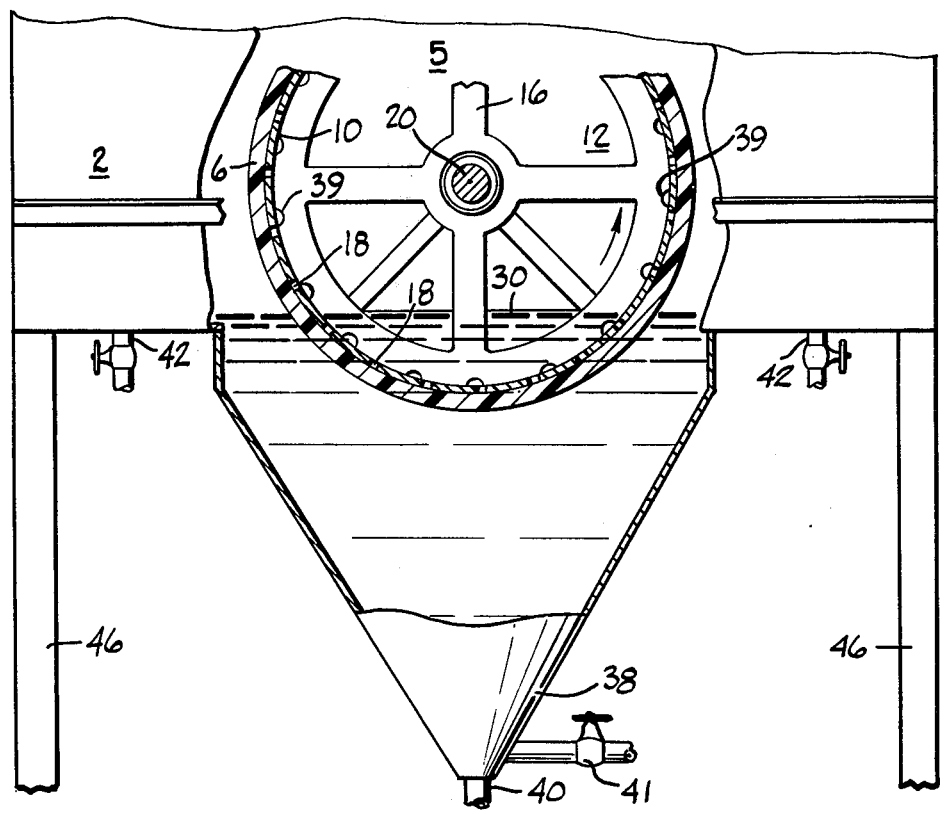
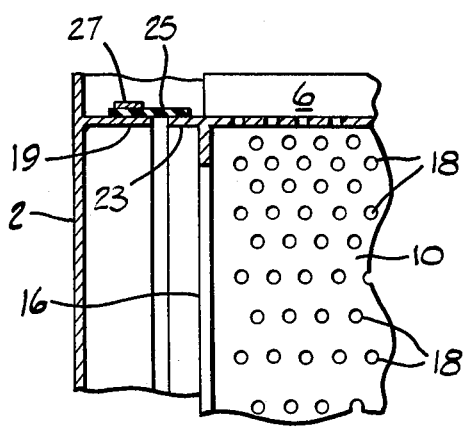

AIR FILTRATION APPARATUS AND METHOD OF OPERATION THEREOF

CROSS REFERENCE TO RELATED APPLICATIONS

This application is a continuation of our co-pending application Ser. No. 590,299 filed June 25, 1975, now abandoned.

BACKGROUND OF THE INVENTION

The invention herein relates to a device for continuously removing particulate matter from a gas stream by filtration. More particularly, it relates to a device utilizing the continuous cleaning effects of wash liquid drawn onto and through the filter medium.

DESCRIPTION OF THE PRIOR ART

Wetted filter systems have been described in the past. These are systems in which the filter medium and wash liquid source are stationary with respect to each other, as in U.S. Pat. Nos. 3,250,059 and 3,370,401, or where the relative motion of the two is such that the wash liquid always impinges on the filter medium from a substantially perpendicular direction, as in U.S. Pat. No. 1,796,405.

CROSS REFERENCE TO PRIOR PATENT

The apparatus of this invention may suitably be used with a wide variety of filter media. However, it is particularly suitable for use with the elastomeric reticulated foam filter media and under the loading conditions described in U.S. Pat. No. 3,873,281 issued on Mar. 25, 1975 to R. C. Himes, B. G. Craig and W. F. Gulick.

BRIEF SUMMARY OF THE INVENTION

The invention herein comprises an improvement in apparatus for the continuous removal of particulate matter from a gas stream. In such apparatus the particulate laden gas at a higher pressure passes through a pervious filter medium to a region of lower pressure and deposits the particulate matter on the solid members of the filter during the passage. The improvement of the invention herein involves apparatus which comprises a foraminous support means for the filter medium, liquid supply means to provide a source of liquid to wet the filter medium, with the liquid being drawn through the filter medium by the pressure differential across the medium whereby the liquid collects and carries with it the particulate matter previously deposited on the filter medium, motive means to cause relative motion between the support (and filter medium carried thereon) and the liquid supply means such that the wash liquid can impinge on a given portion of the filter medium from different directions over a period of time, and means for collection and removal of the particulate containing liquid from the vicinity of the filter medium. Motive means preferentially move the foraminous support and filter medium, usually by rotation, although motion of the liquid supply means can also be effected. In particular embodiments the improved apparatus also comprises the filter medium and its support being rotatable and means to rotate the medium, reservoir below the filter medium and support in which portions of the filter medium can be continually immersed and/or spray nozzles or reservoir filling means to provide a liquid source to wet and flush the filter medium. The apparatus may also contain squeezing means to provide intermittent or continuous pressure against portions of the filter medium to aid in flushing water through the medium and breaking up any caking of the particulates.

The invention herein also comprises an improved process for removal of particulate matter from gas streams utilizing the above apparatus and under the same conditions. In this improved process the filter medium is wetted with liquid impinged on the filter from a plurality of directions over a period of time, such that at least a portion of the wash liquid is forced to pass through the filter medium collecting the deposited particulate matter in the wash liquid and a portion washes particulate matter from the outer surface of the filter medium and the particulate containing wash liquid is then collected and removed from the vicinity of the filter medium. In the process wash liquid may be provided either by spray nozzles or by reservoir means into which the filter medium is immersed. The filter medium and wash liquid source may be moved relative to each other, usually by rotation of the filter medium, to obtain the different directions of wash liquid impingement on the filter medium. The method also encompasses subsequent downstream separation of entrained particle laden liquid from the gas stream.

BRIEF DESCRIPTION OF THE DRAWINGS

FIG. 3 is a partial cut away end view similar to FIG. 1 illustrating one preferred embodiment of the invention.

FIG. 4 is a detailed view illustrating the sealing configuration indicated in the circled area in FIG. 2.

DETAILED DESCRIPTION AND PREFERRED EMBODIMENTS

Figure 1:
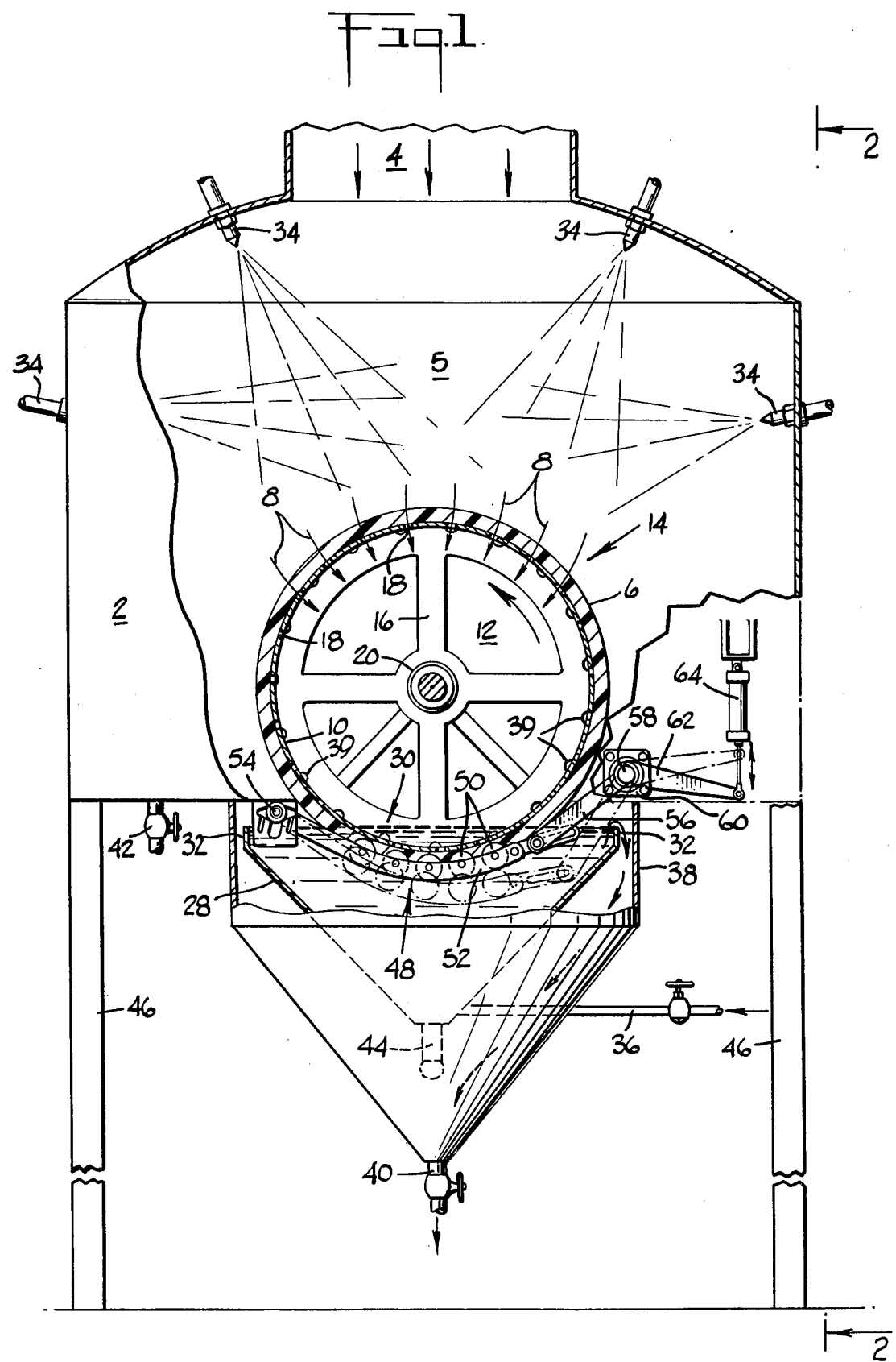
FIG. 1 is an end view partially in section and cut away illustrating the basic components of the apparatus as well as additional components of particular embodiments.

The method and apparatus of this invention will be best understood by reference to the attached drawings.

The apparatus of this invention is enclosed within filtration section housing 2 and liquid separation section housing 3 and the operation of the apparatus is performed within these two enclosures. Gas containing particulate matter enters through conduit 4 as indicated by the arrows. For convenience herein the gas will be exemplified by "air" and the particulate matter by "dust". However, as noted in the aforesaid U.S. Pat. No. 3,873,281 the gas may be any of a wide variety of gases other than air, such as sulphur dioxide, flue gas, steam and the like. Similarly, the particulate matter may be any of a wide variety of liquid and/or solid particles of sub-micron or larger size including such things as oil droplets, dust, fly ash and the like. The specific type of gas and/or particulate matter being filtered here is not especially critical to the invention except that the type of wash liquid and/or filter medium used will be selected to provide the optimum filtration and cleaning for each type of gas and particulate matter. The principles of the apparatus herein and its operation are, however, not dependent upon the specific nature of the gas and/or particulate matter incurred. Thus, the reference hereinafter to "air" laden with "dust" is simply for convenience and brevity and is not intended to be in any manner limiting.

The air entering housing 2 through duct 4 passes into the main compartment 5 of housing 2 and is drawn into and through filter medium 6 as indicated by the curving arrows 8. As dust laden air passes through filter medium 6 the dust is removed therefrom and deposited on the internal and external surfaces of the filter medium. The clean air then continues through perforated medium supporting plate 10 of the support structure 14 and is drawn out through exit conduit 12 (best seen in FIG. 2; seen in cross-section in FIGS. 1 and 3) as indicated by the arrows 13. The air then passes through housing 3, moving between the mist eliminator members 15 and on through for exhausting (or recycling) in the direction indicated by the arrows 17.

A principal part of the filtration system is the support structure generally designated 14. This support structure is foraminous and is designed such that there is relative motion between the support structure containing the filter medium and the source of wash liquid. In the preferred embodiment here shown that relative motion is obtained by rotating the support structure 14 (in the configuration of a drum) under a plurality of stationary spray nozzles 34. It will be appreciated, however, that other configurations in which the support structure moves in other than rotary motion, or the wash liquid source moves, or the filter medium moves through turbulent areas of the wash liquid, are also readily constructed. Some of these are discussed below, and all are considered to be within the scope of the invention.

The drum 14 has a hollow interior with a foraminous cylindrical plate 10 forming the circumference. The plate is supported by ribs and framework 16 normally spaced at each end and usually also at intervals axially along the drum. The plate 10 is perforated by a plurality of small holes 18 (indicated generally in FIGS. 2 and 4). The holes are sized and spaced such that the maximum surface area of the plate is perforated consistent with maintaining sufficient strength in the plate to support the filter medium 6 against the force of the incoming air and the liquid sprays as well as the pressure differential across the filter. Alternately perforated plate 10 may also comprise a plate of heavy wire mesh, expanded metal, or other foraminous material. The particular material from which the plate 10 as well as the framework 16 is comprised will normally be stainless steel, aluminium or other metal compatible with the gas, the wash liquid and particulate matter. Heavy duty plastics may also be used. The relative motion of the filter medium and the wash liquid source is such that each area of the filter medium received liquid impinging from a plurality of directions over a period of time. This assures that the particulate matter is thoroughly dislodged from the filter medium for removal from the outer surface or by passage through the filter medium with the wash liquid.

In the embodiment shown, the drum 14 rotates on axle 20 which is journaled at each end in bearings 22 (only one of which is shown) and driven by motor 24 through suitable gear reduction means 26. Belt drives, chain drives and the like are also quite satisfactory. The drive speed of the drum will be relatively low, generally on the order of fractional RPM up to a few RPM. The drum may be continually driven or the drive may be intermittent with the drum stationary for various periods of time between rotation periods. Rotation of the drum also serves to equalize the liquid wetting of the filter medium as well as minimizing local concentrations of deposited particulate matter.

The drum 14 will be suitably sealed as in the manner illustrated in FIG. 4. A circumferential cylindrical flange 23 extends outwardly from the edge of the drum adjacent to a similar cylindrical collar 19 welded to the housing 2. (Flange 23 may if desired be simply an unperforated extension of plate 10). Attached to the outer surface of collar 19 is a continuous cylindrical seal 25 (secured by restraining strap 27) spanning the gap between the rotating drum flange 23 and the collar 19. The entering air is thus forced to pass through the filter medium and perforated drum so that no by-pass of particle laden air occurs.

Located at various points around the housing 2 and projecting into the compartment 5 are spray nozzles 34. From these are projected coarse liquid sprays, which liquid serves as the cleaning medium to remove the particulate matter from the filter medium and carry it out for disposal and/or collection. Again for the purpose of brevity the fluid will hereinafter be referred to as "water" which will normally be the preferred wash liquid. However, other wash liquids such as various hydrocarbons and other organic liquids as well as aqueous solutions of acids, alkalies, detergents, salts and the like can be used where desirable for a specific type of collected particulate matter and where compatible with the filter medium and other materials in the apparatus with which fluid will come in contact. Where the water sprays are utilized to provide the wetting liquid the sprays from nozzle 34 will keep the filter medium continually wetted, thus enhancing the particulate collection by the filter medium, especially for the capture of dry particulate. (The filter medium can also be wetted by the reservoir liquid described below.) As is commonly defined in the industry, keeping the filter medium wetted means keeping the strands of the filter medium substantially coverd with a film of the wetting liquid. It is believed that generally in the operation of this apparatus the wetting of the particulate matter occurs upon impact with the wet filter medium rather than by being wetted during passage through compartment 5. This is particularly true with fine particles and coarse sprays. After the particles have been deposited on the wetted filter medium by the air stream the wash liquid passing through the filter medium under the force of the pressure drop across the medium draws with it the accumulated particulate matter which has been removed from the air. The particulate laden water droplets are then further drawn through the interior of the drum 14 and out through passage 12 into housing 3. Here the particulate laden water droplets are separated from the moving air stream. Some removal is accomplished simply by the sudden drop in air velocity due to the greatly expanded size of the housing 3 as compared to the passage 12 and drum interior 14. Other separation is caused by mist separator elements 15 here illustrated as horizontal slats. Other configurations of conventional mist separators such as vertical slats or the like may also be used. The separated water droplets containing the collected particulate matter drop to the bottom of housing 3 where they flow along to drain 35 as indicated by the arrows 37 and are removed from the system.

Figure 2:
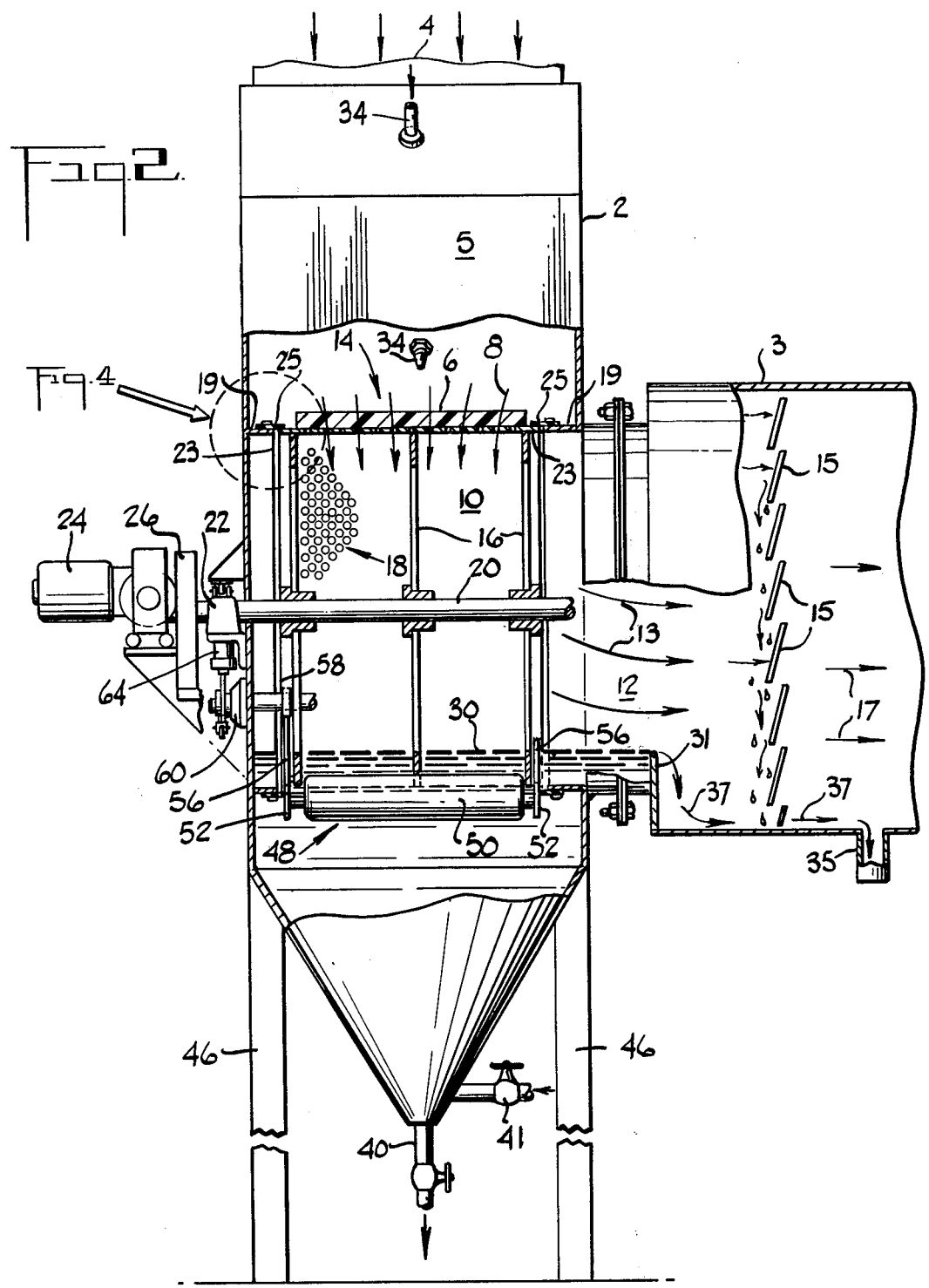
FIG. 2 is a side view taken in the direction of plane 2—2 in FIG. 1, also partially in section and cut away illustrating the apparatus of the present invention as well as its manner of operation.

Also incorporated in the present apparatus is main reservoir 38 which is disposed directly below the drum 14. In the embodiment illustrated in FIG. 3 reservoir 38 is filled with water to a level above the bottom of drum 14 so that a portion of filter medium 6 is immersed in the water (the surface of the water being indicated by the numeral 30). The actual water level is controlled by the baffle or weir 31 which in the embodiment shown in FIG. 2 is a part of housing 3. The overflow water follows arrows 37 out through drain 35. The level of water in reservoir 38 is maintained in either or both of two manners. In one instance excess spray coming from nozzles 34 drains from the drum assembly 14 and is collected in reservoir 38. Alternatively, reservoir 38 can be filled by water entering through fill pipe 41. If desired both of these means of maintaining the water level can be employed. The water draining from drum 14 will carry with it a certain portion of the particulate matter. This will be removed with the overflow water. Also when desired reservoir 38 can be drained of water and particulate matter by use of drain 40.

Removal of particulate matter from the filter medium 6 can be accomplished not only by the passage through the medium of the spray water from nozzles 34 but also by a flushing action caused by the immersion of the filter medium 6 in the water in reservoir 38. The pressure drop across the filter medium and the resulting reduced pressure created within the drum 14 serves to draw water from reservoir 38 and pull it through the filter medium 6 into the interior of drum 14 bringing with the water the accumulated particulate matter flushed from the surfaces of the filter medium. The flushing effect is particularly pronounced at and immediately above the points at which the filter medium enters and leaves the reservoir liquid. The flushed water continually flows out through passage 12 and over baffle 31 to be drained out through drain 35. To aid in the passage of the water past the sides of the drum openings 39 may be cut into the supporting framework 16. This flushing action of the water in the reservoir may be used independently of or in conjunction with the spray nozzles 34. Thus, in different embodiments the sprays can be used alone, the reservoir can be filled and used for the flushing action alone or, preferably, the two can be used in conjunction.

In another embodiment shown in FIG. 1 the structure also contains inner reservoir 28 having associated therewith fill pipe 36 and drain 44. The water level (again indicated as 30) in inner reservoir 28 is determined by edges 32 which create a weir effect. The overflowing water flows into main reservoir 38 and is drained out through drain 40. Again the immersion and flushing action previously described for the configuration of FIG. 3 is also applicable here.

Housing 2 is supported by legs 46 and similar supports (not shown) support housing 3. These legs elevate the operating structure to a convenient level for maintenance. Also included in housing 2 are drains 42 which can be used to drain any liquid in housing 2 so that maintenance, repair and filter medium replacement activities can be conveniently accomplished. For these same purposes the housings 2 and 3 will normally contain one or more closable man-ways (not shown) to permit workmen to have access to the interior of the housing.

In another embodiment of the apparatus squeezing means are provided to compress and release the filter medium, preferably while it is immersed within the water in reservoir 38 (or reservoir 28). This can be a significant aid in particulate removal from the filter medium 6, especially when the particulate has a tendency to cake on the filter.

As shown in FIGS. 1 and 2 the squeezing means (generally designated 48) comprises a series of bars 50 which are journaled in parallel bracket arms 52. In the embodiment shown the bars 50 are cylindrical rollers; however, these bars 50 may also be square or rectangular in cross-section in order to press a flat surface against the filter medium, or the bars may have a slightly concave surface which would conform generally to the surface curvature of the drum and the filter medium.

The bracket arms 52 are generally arcuate in shape in order to conform generally to the curvature of drum 14 and filter medium 6. One end of each bracket arm 52 is pivoted in a bearing 54. The other end is slideably connected to lever arm 56. Lever arm 56 in turn is fixedly mounted to axle 58 which passes entirely through the opposite walls of housing 2 and is journaled at each end in bearing 60 (only one of which is shown). At one end of axle 58, outside housing 2, is fixedly attached lever arm 62 which in turn is connected at its opposite end to piston 64 also mounted on the outside of housing 2. When the compressing or squeezing effect is not desired piston 64 is retracted as shown in phantom in FIG. 1. Lever arms 56 and 62 thus pivot in a fixed relationship around axle 58 and serve to move bracket arms 52 and bars 50 away from engagement with the filter medium 6, also as shown in phantom in FIG. 1. Conversely, when the squeezing action is desired, piston 64 is extended and the associated linkages force the bars into engagement with the filter medium. The squeezing action may then occur by rotating the drum continuously or intermittently against the rollers and/or by repeatedly operating piston 64 to engage and disengage the contact between the bars 50 and the filter medium 6.

In another embodiment the squeezing mechanism may comprise an inflatable bag or diaphragm inflated by pneumatic or hydraulic means.

Figure 5:
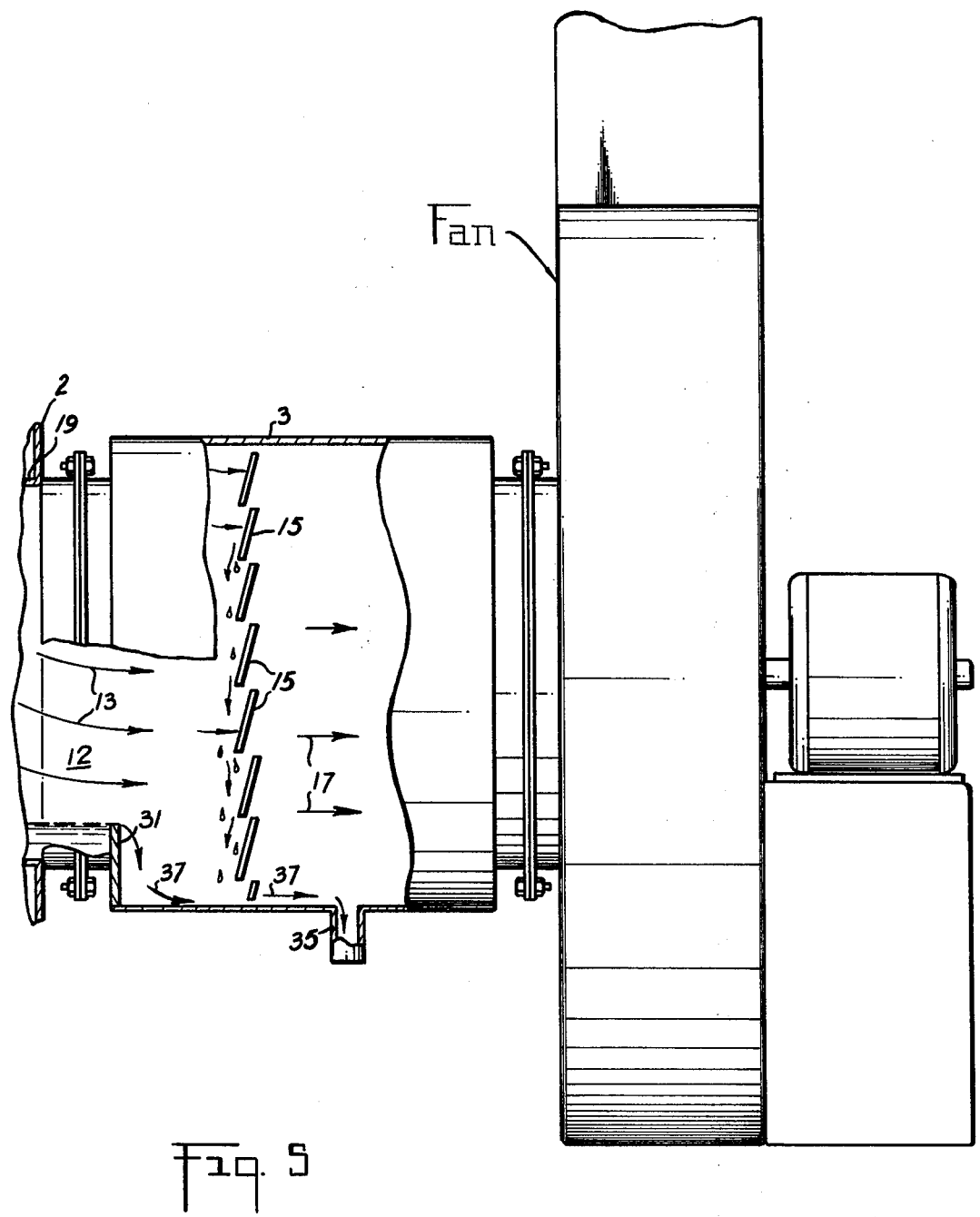
FIG. 5 shows a typical fan for forcing the gas stream through the filter unit.

The operation of this apparatus will be evident from the description. The dust laden air enters the housing under a substantial velocity, usually imparted by fans or blowers mounted either or both upstream and downstream of the filtration unit. FIG. 5 shows such a fan mounted downstream of the filtration unit. The dust laden air impinges upon and passes through the filter medium and the supporting foraminous plate, depositing its load of dust on the filter medium during the passage. The exact mechanism of separation of dust from the air has not been determined, but it is believed to involve varying combinations of inertial impaction, impingement and preferential adhesion of the particulate matter to the wetted filter structure. Particulate removal efficiencies are on the order of 80%–90% or better. The cleaned air, at somewhat lower pressure, then flows through the interior of drum 14 and out through passage 12 and housing 3 for exhaustion to the atmosphere, recycling, or other use.

In the in situ cleaning aspect of this process, the particulate matter deposited on the wetted filter medium is subsequently washed therefrom by the action of the spray from nozzles 34 being pulled through the filter medium by the pressure drop across the medium and/or by the flushing action created by the pressure differential on the water in reservoir 28 or 38. Relative motion of the filter medium and the liquid source substantially enhances the particulate removal and is a substantial factor in the superior operation of this invention, particularly in the "high energy" air filtration regime. The particulate laden water continually flows through the interior of the drum 14 and out into the overflow reservoirs of the overflow portion of housing 3. Under normal operation it has been found that the majority of the water flows horizontally into housing 3 for removal rather than being drained out through the reservoirs.

After removal of the particle laden water from the system the particulate matter and water can be separated for disposal or recovery of the solid material and recycle or discharge of the water by conventional means not shown.

The invention herein is as noted particularly suitable for use in a high energy air filtration process of the type described in the aforesaid U.S. Pat. No. 3,873,281. In such a process the gas velocity at the upstream face of the filter medium is in the range of 300 to 4000 feet per minute and there is a pressure drop of 7 to 60 inches of water across the filter medium. The examples below are taken from experimental work utilizing such a process. While the present invention is amenable to use under other conditions, it is of particular utility in this type of process because the conditions which prevail are those in which filters, even cleanable ones, are not usually considered satisfactory.

The following tabulated examples will illustrate the capabilities and operation of the apparatus of this invention. In each case the filter medium was a reticulated polyurethane foam of the type described in the aforesaid U.S. Pat. No. 3,873,281 and commercially available from the Scott Paper Co. As described in U.S. Pat. No. 3,873,281, the reticulated polyurethane foam can be described by reference to the foam disclosed in U.S. Pat. No. 3,171,820 to Volz. The polyurethane resin is formed by the reaction of a diisocyanate with a polyhydroxy material. The polyurethane foam is produced by generating carbon dioxide or another gas in the reaction mixture while converting a liquid form of the polyurethane resin to a solid form. The gas or vapor is ordinarily generated while the material to be formed is in the plastic state. The generation of this gas results in the formation of bubbles, approximately spherical in form. As these bubbles expand, cells are formed which have more or less definite geometric configurations. The optimum packing sphere is an arrangement in which each sphere is surrounded by twelve other spheres; and correspondingly it has been found that the cells formed by the expansion of gas bubbles to the point of contact, as to produce the low density, open-cell cellular structures, generally are in the form of dodecahedrons, with pentagonal sides or faces. This is the general rule, although in any foamed mass will be found cells of varying geometry. At the intersection of the faces are heavier strands of material. Between the strands forming the cell faces or walls are very thin membrane-like films. Ordinarily a minor proportion of the faces rupture during foaming, so that some cells are interconnected. Such foam is referred to as "open-celled". The various materials used to form the polyurethane resins, as well as common method of forming the open-celled foam, are well known and are described in detail in the Volz patent.

A reticulated foam useful in the improvement of the present invention (exemplified herein by a polyurethane foam) is produced from the open-celled foam described above by a process known as "dewindowization". Dewindowization, as used herein, refer to the removal of membraneous elastomer from the faces of some or all cells throughout the structure, leaving a resulting skeletal network structure known as a partially or fully reticulated foam. Dewindowization may be accomplished in a number of ways, some of which are basically physical and some chemical; the Volz patent describes several. The resulting reticulated foam has strands of solid polyurethane resin integrally interconnected by thickened nexus at spaced-apart points so as to form the isotropic skeletal outline of a multitude of polyhedrons whose faces are polygonal, common to a polyhedron adjacent thereto, open and partially or substantially free from membraneous polyurethane resin, and the network itself is substantially free of permeatoidal degraded strands and nexus. The degree to which the foam will be reticulated (i.e., opened) will depend on the service conditions to be encountered and the design operating parameters. The more highly reticulated the foam, the lower will be the pressure drop across a given thickness of filter medium at a given flow rate. Therefore, the foam must have at least that degree of reticulation which will permit its use within the pressure drop limits of 7 to 60 inches of water defined above. The degree of reticulation can be defined in practice by the void fraction of the foam, i.e., the percentage of the foam volume which consists of void space rather than solid material. In the foams useful in the process of this invention, void fraction will be at least 90%, usually in the range of 90-99%, and preferably 95-99%.

The total filter medium configuration comprised one or more ½" layers of the foam, with the same or different porosities in the various layers. In the following examples porosity of each layer is given in units of average pores per linear inch ("ppi") starting with the outermost layer. The gas was an industrial exhaust air stream from a diatomite powder production facility, the particulate was diatomite powder with a mass median particle diameter of about 0.5 micron, and the wash liquid was water. Efficiency is defined as the percentage of particulate matter removed. ("NM" means a particular value was not measured.)

TABLE

| EXAMPLE NO. | 1 | 2 | 3 | 4 | 5 | 6 | 7 |
|---|---|---|---|---|---|---|---|
| Filter configuration | | | | | | | |
| Number of layers | 4 | 4 | 4 | 4 | 4 | 4 | 3 |
| Layer porosity, ppi | 10/20/30/40 | 10/20/30/40 | 10/20/30/40 | 10/20/30/40 | 10/20/30/40 | 10/20/30/40 | 30/40/40 |
| Filter width, in | 16 | 16 | 16 | 16 | 16 | 16 | 13 |
| Filter surface area, $ft^2$ | 14.1 | 14.1 | 14.1 | 14.1 | 14.1 | 14.1 | 11.5 |
| Water Flow | | | | | | | |
| Spray rate, gal/min | 0 | 0 | 7 | 3.5 | 12 | 12 | 12 |
| Reservoir feed, gal/min | 9.4 | 9.4 | 0 | 0 | 1.9 | 1.9 | 1.9 |
| Drum rotation cycle | | | | | | | |
| On time, sec | 60 | Drum rotation continuous at 1.5 RPM | | | | | |
| Off time, sec | 60 | | | | | | |
| Squeeze cycle | | | | | | | |
| On time, sec | 5 | | | | | | |
| Off time, sec | 3 | | No squeezing | | | | |
| Air flow data | | | | | | | |
| Volume, $kft^3$/min | 31.6 | 32.2 | 31.8 | 31.6 | 31.6 | 31.4 | 29.2 |

TABLE -continued

| | | | | | | | |
|---|---|---|---|---|---|---|---|
| Filter face velocity, kft/min | 2.24 | 2.28 | 2.25 | 2.24 | 2.24 | 2.22 | 2.54 |
| Pressure drop across filter, in. H$_2$O | 15 | 14 | 15 | 15 | 14 | 14.2 | 14.2 |
| Particulate loading of air, grains/std.ft$^3$ | NM | NM | NM | NM | NM | NM | NM |
| Efficiency, % | (a) | 97 | 97.2 | 97.0 | 97.5 | 89 | 88 |
| EXAMPLE NO. | 8 | 9 | 10 | 11 | 12 | 13 | 14 |
| Filter configuration | | | | | | | |
| Number of layers | 4 | 3 | 2 | 1 | 2 | 2 | 4 |
| Layer porosity, ppi | 30/30/40/40 | 40/60/60 | 60/60 | 60 | 40/60 | 60/60 | 10/20/30/40 |
| Filter width in | 13 | 13 | 13 | 13 | 13 | 18 | 16 |
| Filter surface area, ft$^2$ | 11.5 | 11.5 | 11.5 | 11.5 | 11.5 | 15.9 | 14.1 |
| Water Flow | | | | | | | |
| Spray rate, gal/min | 12 | 12 | 12 | 12 | 12 | 12 | 15 |
| Reservoir feed, gal/min | 1.9 | 1.9 | 1.9 | 1.9 | 1.9 | 1.9 | 1.9 |
| Drum rotation cycle | | | | | | | |
| On time, sec | Drum rotation continuous at 1.5 RPM | | | | | | 60 |
| Off time, sec | | | | | | | 20 |
| Squeeze cycle | | | | | | | |
| On time, sec | | | | | | | 2 |
| Off time, sec | No squeezing | | | | | | 58 |
| Air flow data | | | | | | | |
| Volume, kft$^3$/min | 29.9 | 26.0 | 26.6 | 30.2 | 28.2 | 29.6 | 32.4 |
| Filter face velocity, kft/min | 2.50 | 2.27 | 2.34 | 2.73 | 2.57 | 1.97 | 2.29 |
| Pressure drop across filter, in. H$_2$O | 16.5 | 23.2 | 21.8 | 16.2 | 19.6 | 15.8 | 13 |
| Particulate loading of air, grains/std.ft$^3$ | NM | NM | 2.2 | NM | 1.1 | 1.4 | 5.3 |
| Efficiency, % | 87 | 98 | 98 | 94+ | 97 | 98 | (a) |

(a) efficiency not measured but estimated to be approximately 97%.

The above examples all clearly illustrate the versatility of the apparatus of this invention, which permits continuous operation for extended periods at high efficiency and heavy gas loading (1 to 5 grains/std.$^3$ is normally considered too high particle loading of gas for conventional filter operation) of minute particles without clogging, especially at high air flow rates and filter face velocities. In addition to such performance characteristics which are significantly superior to those of conventional filtration devices, it has been found that this apparatus can be operated at only about one-half the energy requirement of convventional high volume non-filter particulate separation devices such as venturi scrubbers.

It will be understood by those skilled in the art that the above description is for the purpose of exemplification only and that there will be other embodiments of the apparatus described herein and its method of operation which will be within the scope and spirit of the invention. Consequently, the invention herein is to be limited only by the appended claims.

What we claim is:

1. A method of removing micron and submicron liquid and solid particulate matter entrained in a gas stream comprising the steps of:

forcing the gas stream with the micron and submicron liquid and solid particulate matter entrained therein through a filter medium at a gas velocity at the upstream face of the filter medium in excess of 500 feet per minute and at a pressure drop across the filter medium greater than ten inches water gauge, where the filter medium has a thickness of about 0.5–2.0 inches and a void fraction in excess of ninety percent, and where the filter medium comprises a three-dimensional network of interconnected strands of material with the strands being integrally connected at spaced apart nexus to form a skeletal outline of a multitude of interconnected open cells with each opening to each cell common to an adjacent cell;

spraying a wash liquid onto the upstream face of the filter medium so that the sprays of wash liquid substantially uniformly cover the upstream face of the filter medium to keep the strands of the filter medium wetted with the wash liquid and so that the wash liquid migrates through the filter medium in the direction of gas flow to be blown off the downstream side as wash liquid droplets, the liquid and solid particulate matter being separated from the gas stream upon contact of the liquid and solid particulate matter with the wash liquid wetting the strands of the filter medium so that the separated liquid and solid particulate matter is carried in the wash liquid and is moved through the filter medium in the wash liquid to be removed from the downstream side of the filter medium in the wash liquid droplets; and subsequently passing the gas stream and the particulate matter laden wash liquid droplets through a mist separation device after passage of the gas stream through the filter medium to separate substantially all of the particulate matter laden wash liquid droplets from the gas stream.

2. The method of claim 1 further including moving the filter medium relative to the position from which the collection liquid is sprayed onto the filter medium to affect said uniform application of the sprayed wash liquid to the upstream side of the filter medium.

3. The method of claim 1 wherein the filter medium has at least 45 pores per linear inch.

4. The method of claim 3 wherein the filter medium is a reticulated polyurethane foam.

5. The method of claim 3 wherein the wash liquid is water.

6. The method of claim 2 wherein the pressure drop across the filter medium is at least 15 inches water gauge.

7. The method of claim 3 wherein the wash liquid is an aqueous solution.

8. A system for removing micron and submicron liquid and solid particulate matter entrained in a gas stream comprising:

a filtration unit including a filtration housing defining a filtration chamber therein, a gas inlet to said chamber and a gas outlet from said chamber; a foraminous support in said chamber between said gas inlet and said gas outlet; a filter medium mounted on said foraminous support so that the gas stream must pass through said filter medium and said foraminous support as it moves from said gas inlet to said gas outlet, said filter medium having an upstream side facing said gas inlet, a downstream side opposite said upstream side, a thickness of about 0.5–2.0 inches, a void fraction in excess of ninety percent, and comprising a three-dimensional network having strands of material integrally interconnected at spaced apart nexus so as to form the skeletal outline of a plurality of cells with a plurality of openings to each cell where each of the openings is common to two of the cells;

wash liquid supply means including a plurality of spray nozzles for uniformly spraying wash liquid onto the upstream side of said filter medium to said strands of said filter medium wetted with wash liquid;

mist separation means connected to said gas outlet of said filtration unit so that the gas stream passes therethrough after passage through said filtration unit; and, forcing means for forcing the gas stream with the particulate matter entrained therein through said filtration unit from the gas inlet through said filter medium to the gas outlet so that the gas velocity at the upstream face of the filter medium is in excess of 500 feet per minute at a pressure drop across the filter medium of 10–40 inches of water to cause the sprayed wash liquid to wet the strands of said filter medium and migrate through said filter medium to be separated from the downstream side of said filter medium as wash liquid droplets while causing the particulate matter entrained in the gas stream to impinge on the wash liquid wetting the strands of said filter medium to separate the particulate matter from the gas stream so that the separated particulate matter is carried in the wash liquid migrating through said filter medium and subsequently separated from said filter medium in the wash liquid droplets being blown off the downstream side of said filter medium, said forcing means forcing the gas stream and the particulate matter laden wash liquid droplets from the gas outlet in said filtration unit through said mist separation means so that said mist separation means separates the wash liquid droplets carrying the particulate matter from the gas stream.

9. The system of claim 8 further including drive means for moving said foraminous support and said filter medium relative to said spray nozzles.

10. The system of claim 9 wherein said foraminous support includes a support drum including a perforated side wall which mounts said filter medium on the periphery thereof so that the gas stream passes through said filter medium and said perforated side wall into the interior of said support drum and then out through said gas outlet in said filtration housing.

* * * * *